United States Patent [19]

Moisson et al.

[11] Patent Number: 4,498,938

[45] Date of Patent: Feb. 12, 1985

[54] SPLICING, BRANCHING OR TERMINATING CABLE

[75] Inventors: Marc Moisson, Strombeek-Bever; Lodewijk Van Noten, LeUven; Noel Overbergh, Bertem; Joris Franckx, Bonheiden; Valere Buekers, Zelem, all of Belgium

[73] Assignee: N.V. Raychem S.A., Kessel-lo, Belgium

[21] Appl. No.: 549,002

[22] Filed: Nov. 2, 1983

Related U.S. Application Data

[63] Continuation of Ser. No. 494,691, May 17, 1983, abandoned, which is a continuation of Ser. No. 261,400, May 7, 1981, abandoned.

[30] Foreign Application Priority Data

May 12, 1980 [GB] United Kingdom ................. 8015697
Dec. 2, 1980 [GB] United Kingdom ................. 8038629

[51] Int. Cl.³ .......................... B21F 15/06; H01R 3/02
[52] U.S. Cl. ..................................... 156/49; 156/54; 156/55; 156/56; 156/86; 174/92; 174/93; 174/DIG. 8; 285/373; 285/381; 285/DIG. 10; 403/273; 403/344; 428/36; 428/913
[58] Field of Search ........................ 156/49, 51, 52, 54, 156/55, 56, 53, 86; 174/84 R, 91, 92, 93, DIG. 8; 285/373, 381, DIG. 10; 403/273, 344; 428/36, 913

[56] References Cited

U.S. PATENT DOCUMENTS

| | | |
|---|---|---|
| 2,027,962 | 1/1936 | Currie . |
| 3,086,242 | 4/1963 | Cook et al. . |
| 3,379,218 | 4/1968 | Conde ................... 138/99 |
| 3,451,609 | 6/1969 | Gillett ................ 174/84 X |
| 3,541,495 | 11/1970 | Ellis et al. ............ 339/177 |
| 3,816,335 | 6/1974 | Evans ................... 252/408 |
| 3,852,516 | 12/1974 | Ploog et al. ........ 174/71 R |
| 3,964,945 | 6/1976 | Everhart et al. ....... 156/52 |
| 4,018,733 | 4/1977 | Lopez et al. ..... 156/327 X |
| 4,025,717 | 5/1977 | Whittingham ..... 174/88 C |
| 4,144,404 | 3/1979 | Groef et al. ....... 174/88 C |
| 4,181,775 | 1/1980 | Corke ................... 428/348 |
| 4,194,082 | 3/1980 | Campbell .......... 156/86 X |
| 4,203,000 | 5/1980 | Muller ................... 174/92 |
| 4,226,903 | 10/1980 | Gottung et al. ... 156/53 X |
| 4,246,438 | 1/1981 | Gozlan ............... 174/88 C |
| 4,283,596 | 8/1981 | Vidakovits et al. .... 174/84 R |
| 4,345,109 | 8/1982 | Silver et al. ....... 174/84 R |
| 4,350,842 | 9/1982 | Nolf ....................... 174/92 |

FOREIGN PATENT DOCUMENTS

| | | |
|---|---|---|
| 2447164 | 4/1975 | Fed. Rep. of Germany . |
| 2807154 | 11/1979 | Fed. Rep. of Germany . |
| 2943371 | 5/1980 | Fed. Rep. of Germany . |
| 2409608 | 6/1979 | France . |
| 1211988 | 11/1970 | United Kingdom . |
| 1346479 | 2/1974 | United Kingdom . |
| 1431167 | 4/1976 | United Kingdom . |
| 1440524 | 6/1976 | United Kingdom . |
| 1453809 | 10/1976 | United Kingdom . |
| 1511053 | 5/1978 | United Kingdom . |
| 1155470 | 6/1979 | United Kingdom . |
| 2019120 | 10/1979 | United Kingdom . |
| 2021879 | 12/1979 | United Kingdom . |
| 2038478 | 7/1980 | United Kingdom . |
| 1586388 | 3/1981 | United Kingdom . |
| 2075990 | 11/1981 | United Kingdom . |
| 2107939 | 5/1983 | United Kingdom . |

OTHER PUBLICATIONS

XAGA 200 Splice Closure System for Distribution Network brochure, Nov. 1979, Raychem Corp.

Primary Examiner—Robert Dawson
Attorney, Agent, or Firm—Edith A. Rice; Herbert G. Burkard; Timothy H. P. Richardson

[57] ABSTRACT

A cable splice, branchout or termination has a heat recovered member (30) around one or more cable portions (33) extending out of an end of the member (30). The cable portion (33) is protected from physical damage and heat by placing around it individually a metal foil member (1), preferably aluminium of thickness 150–250 microns. The metal foil member is preferably coated with a hot melt adhesive (2) and a mastic (5) at distinct locations. A pressure sensitive adhesive (4) may also be provided to help secure the foil member (1) around the cable portion (33) before recovery of the outer member (30). Apertures (44) may be provided in the foil member (1) to allow passage therethrough of hot melt adhesive provided on the inner surface of the recoverable member (30).

47 Claims, 19 Drawing Figures

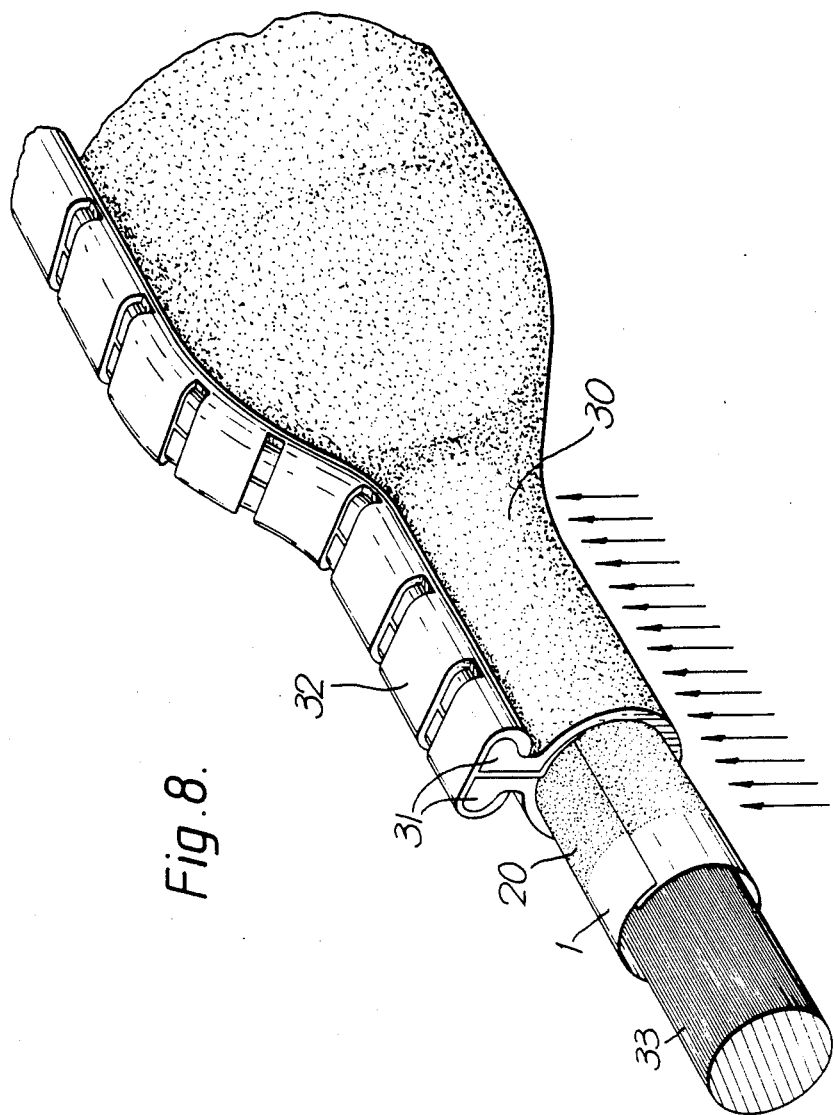

SPLICING, BRANCHING OR TERMINATING CABLE

This application is a continuation of application Ser. No. 494,691, filed May 17, 1983, now abandoned, which is a continuation of application Ser. No. 261,400, filed May 7, 1981, now abandoned.

This invention relates to a method of making a cable splice, branchout, or termination, to splices, branchouts and terminations themselves, and to a metal foil member for use therein.

The invention is more particularly concerned with cable splices, branchouts, terminations, wherein a heat-recoverable member is heat recovered about one or more cable portions.

In such arrangements, the relevant cable portion(s) especially in smaller cables (e.g. less than 15 mm diameter) can become overheated during heat recovery of the heat recoverable member. Such overheating is undesirable per se, and can so soften the insulation of insulated cable portions that serious problems can arise owing to the recovering sleeve severely distorting the cable portion or pressing it against hard members such as an adjacent branch-off clip or even the recovering edge of the sleeve itself, with the result that the cable insulation may be partly or completely penetrated. This distortion or indentation of the cable insulation is a potential source of electrical failure and can be particularly troublesome where the heat-recoverable member surrounds a plurality of cable portions, one of which may be of substantially smaller diameter than at least one other of the cable portions.

Many attempts have been made to place thermally insulating materials around such smaller diameter cable portions, but these approaches to the problem have generally been unsatisfactory, for example owing to the difficulty of handling the insulating material at installation temperatures which may range from $-10°$ to $+40°$ C. The present invention takes a completely different approach.

The present invention provides a method of making a cable splice, branchout, or termination, having a heat-recovered member about a plurality of cable portions extending out of an end of the member; comprising placing around at least one of the cable portions individually a metal foil member of such stiffness as substantially to prevent radial distortion or indentation of the foil-surrounded cable portion during heat recovery of the heat-recoverable member, and causing heat recovery of the member. It will be understood that this placing, which is preferably by wrapping, of the foil member around at least one of the cable portions individually excludes the known arrangements wherein a metal shell or liner is placed around a plurality of cable portions collectively for the different purpose of providing a smooth profile for the heat-recoverable member to recover onto. In this invention all the cable portions will generally be insulated, although this is not essential.

The invention also provides a method of making a cable splice, branchout, or termination, having a heat-recovered member about at least one cable portion extending out of an end of the member; comprising placing around the cable portion individually a metal foil member arranged to extend from within the heat-recoverable member to a position beyond an end of the heat-recoverable member, the metal foil member having sufficient stiffness substantially to prevent radial distortion or indentation of the foil-surrounded cable portion during heat recovery of the heat-recoverable member, and causing heat recovery of the member.

The invention further provides a splice, branchout, or termination as defined above, and also the metal foil member used in it.

The invention further particularly provides a metal foil member suitable for wrapping or otherwise placing around a cable portion in a splice, branchout, or termination, which comprises an aluminium sheet of thickness 150–250 microns, coated with a hot melt adhesive and a pressure sensitive adhesive. The pressure sensitive adhesive is preferably protected before use by a release layer. The aluminium sheet preferably also carries a mastic, and preferably has apertures through which adhesive can pass when heating during recovery of the sleeve. The hot melt adhesive and the mastic are preferably at distinct separate locations over the aluminium sheet to facilitate wrapping of the sheet around a cable. Areas of foil having no adhesive can act as hinges. The use of discrete portions of adhesive to facilitate wrapping is, however, not always essential, particularly in narrow width tapes of the metal foil.

The principle of the present invention has the considerable advantages of greatly reducing the bulk of protective material around the foil-surrounded cable portion, and the high thermal conductivity of the metal, in direct contrast to the insulating materials previously tried, has positive advantages in ensuring that an adequate seal can be formed by heat-recoverable adhesive between the foil member and the cable portion.

It will be appreciated that foils previously used around cables have been of thin, very flexible construction, having a highly radiative surface so as to reflect heat from a heat source used to recover the sleeve. The present invention envisages at least a portion of the foil to be inside the sleeve specifically so as to ensure that heat reaches the region between cables, especially the region between a small diameter cable and a large cable, by conduction to effect sealing. In addition, the present foil member provides a mechanically strong support around the cable for the recovering sleeve.

Although a metal foil integral tube or half-shells assembled to form a tube could be used, it is preferred to use a metal foil member which can be wrapped around the smaller diameter cable portion.

The aforementioned adhesive seal could be formed by a heat-activatable adhesive normally carried on the inside surface of the sleeve or other heat recoverable member flowing through suitable apertures in the foil member, but it is preferred to carry the adhesive on the foil member with the adhesive surface facing the cable portion. It has been found that this arrangement enables the total amount of heat-activatable adhesive within the enclosure to be reduced, since less adhesive need be carried by the heat recoverable member when there is no need for any excess to form the bond between the metal member and the cable portion.

When an apertured foil member is used, adhesive may be provided with the heat recoverable sleeve, and adhesive may be secured, before recovery, to an inner surface of the sleeve. The apertures, which may be elongate in a direction transversely to that in which the foil is wrapped around the cable, may be of generally rectangular or diamond shape, and preferably extend to one or both edges of the foil, which itself is advantageously of generally rectangular shape. The foil member may be such as to surround the cable once, with its ends in abutment, with a small overlap (of, say, at least 20°), or with a larger overlap (of, say, 360°).

Preferably, the heat-activatable adhesive carried by the foil is in discrete portions distributed so as to facilitate wrapping of the foil around the cable portion. Parallel beads of the heat-activatable adhesive arranged to extend lengthwise along the cable when the metal foil is wrapped thereon are preferred, but other arrangements of dots or other configurations of adhesive portions could be used.

The kind of adhesive used may be selected to suit the conditions in question. Hot melt adhesives, such as those described in U.S. Pat. Nos. 4,018,733 and 4,181,775, based on polyamides, or ethyl vinyl acetate systems, or mixtures thereof, having good tack at 85°–90° C. may be suitable for some purposes, and mastics, such as systems based on butyl rubber based systems, e.g. polyisobutylene mastics, and EPDM rubber, or EPM based mastics may be suitable for other purposes. The disclosures of these patents are incorporated herein by reference.

In some applications, however, it has been found that the mastics, while providing excellent moisture sealing characteristics, do not have sufficient resistance to linear movement of the cable, and that hot melt adhesives, while having the greater rigidity to resist such movement, do not maintain an adequate moisture seal. An elegantly simple solution to this problem has been devised in a preferred embodiment of the present invention, wherein the metal foil carries hot melt adhesive on one portion of its surface and mastic on another portion of its surface in an arrangement such that the foil can be wrapped around the cable with the hot melt and the mastic at separate locations along the cable. When so-arranged, the hot melt adhesive, preferably having a flow temperature substantially lower than that of the mastic, will tend to act as a dam to prevent gradual flowing out of the mastic, and it is preferred to use a foil having hot melt coated portions on either side of a mastic coated portion, so that it does not matter which way the operator wraps the foil around the cable in practice.

A particularly preferred hot-melt adhesive for the present purposes is described and claimed in our U.K. Patent Publication No. 2,075,990 the disclosure of which is incorporated herein by reference. This application describes and claims an adhesive composition produced by mixing a thermoplastic polyamide having reactive amine groups attached to the polyamide molecule with a vinyl-terminated rubber.

In a further preferred embodiment of the present invention, a coating of pressure-sensitive adhesive is applied over the hot melt adhesive(s) to assist in locating the foil on the cable prior to activation of the heat-activatable adhesive(s). When mastics (normally tacky) are used, the pressure sensitive adhesive may be omitted. Suitable pressure-sensitive adhesives include systems based on polystyrene, polybutadiene or elvax with suitable tackifiers, but others may be used according to preference. The quantity and nature of the pressure-sensitive adhesive are preferably chosen so that it is incorporated into the other adhesives upon heat-activation thereof, without detracting from the overall adhesive performance.

The foil member is preferably coated with polyolefin, preferably polyethylene, to improve corrosion resistance, and provide a uniform surface for adhesive bonding. The polyolefin may be flame-brushed or corona treated to improve the adhesion.

The preferred foil member is aluminium foil of 150 to 250 microns thickness, preferably 200 microns thickness, preferably coated on both sides with a polyethylene layer of 40 to 60 microns thickness, most preferably 50 microns. The foil member could be built up from layers of thinner materials, but this would normally be less convenient in practice.

In a preferred embodiment of the invention, the heat conductivity of the metal foil is utilised to provide an indication of adequate heating to activate the adhesives or sealants inside the heat recoverable member. This is done by providing the foil member with a temperature indicator, preferably a thermochromic coating at least on a portion of the foil which can be arranged to project from the end of the sleeve. In that preferred arrangement, heat conducted along the foil causes the temperature indicator to indicate when the interior of the heat recoverable member reaches an appropriate temperature. If desired, thermal insulation may be provided immediately adjacent to the end of the heat recoverable member, preferably on the foil itself, to prevent accidental direct heating of the protruding foil from giving a false indication.

In one form of the invention, a heat barrier member can be provided, preferably as part of the metal foil member; in such case the metal foil member could comprise a metal foil and a heat barrier bonded to it. The provision of a heat barrier member can be advantageous when cables are subjected to heat as well as to mechanical forces. Small cables having poor heatsink properties will benefit particularly from the provision of a heat barrier member. The provision of an insulating member allows air to be used as the insulating medium for very little extra bulk around the cable. This is preferable to the provision of an additional heat sink which can take up too much room. Of the ways in which a heat barrier member can be provided, two are preferred. A layer of foam material may be bonded to a metal foil, preferably leaving a pressure-sensitive border around the edge of the foil to help secure the foil to a cable. A second embodiment is to use a ribbed tube, through which the cable passes and around which a metal foil is wrapped.

Specific embodiments of the present invention will now be described by way of example, with reference to the accompanying drawings wherein:

FIG. 1 indicates schematically a roll of adhesive coated aluminium foil suitable for use in the present invention;

Figure 6A:
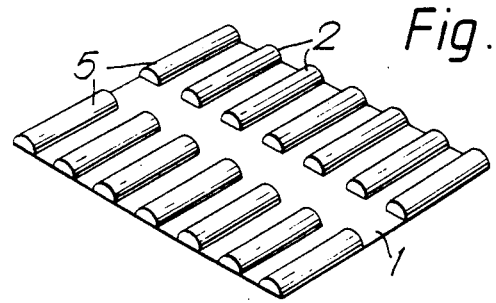
Figure 6B:
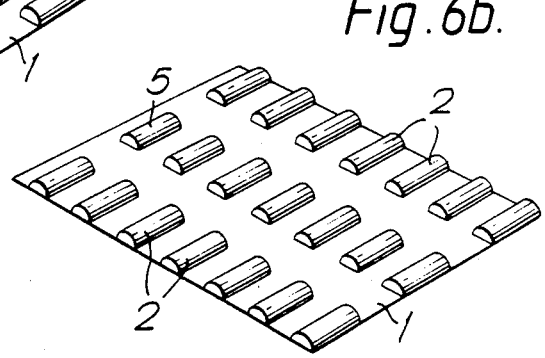
Figure 7:
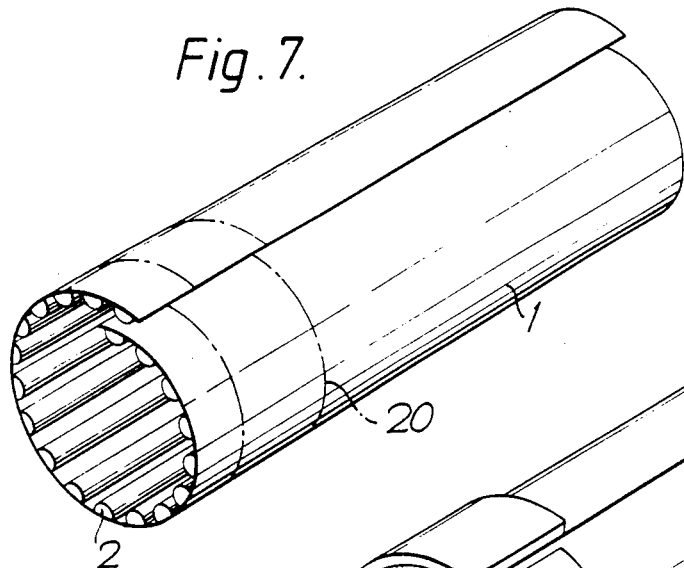
Figure 9:
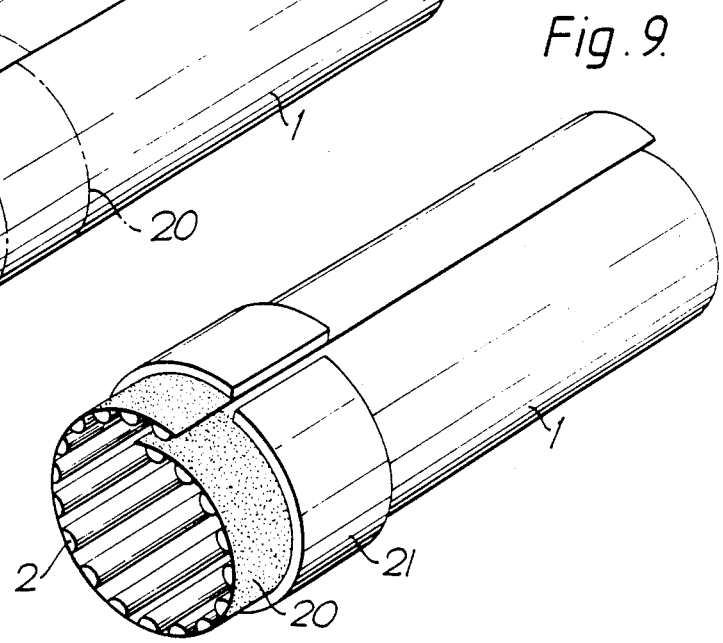
Figure 10:
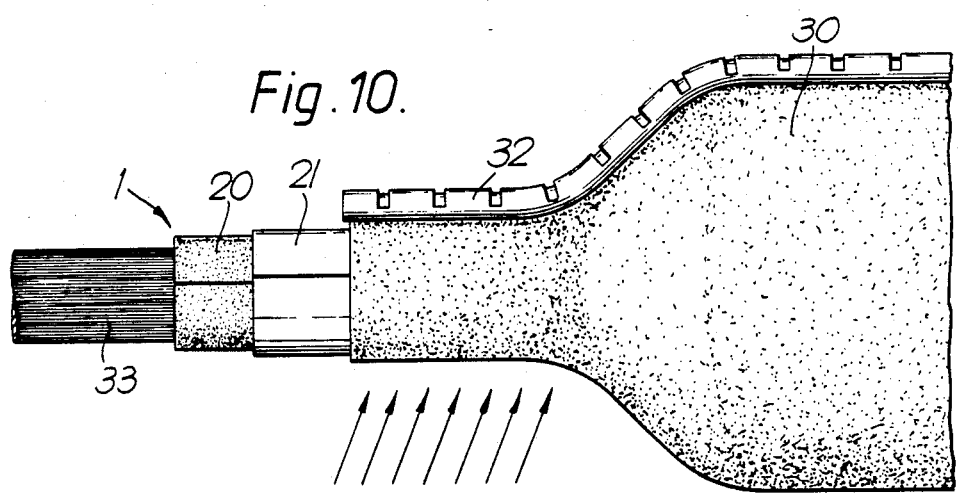
Figure 11:
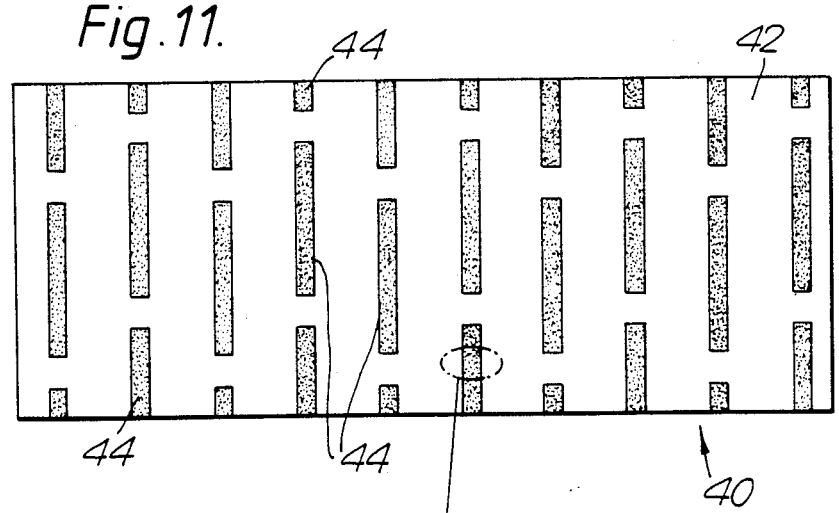
Figure 12:
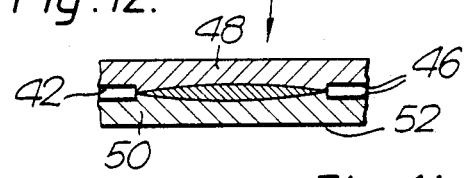
Figure 13:
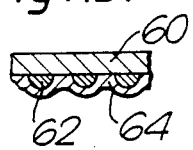
Figure 14:
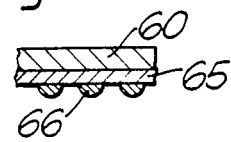
Figure 15:
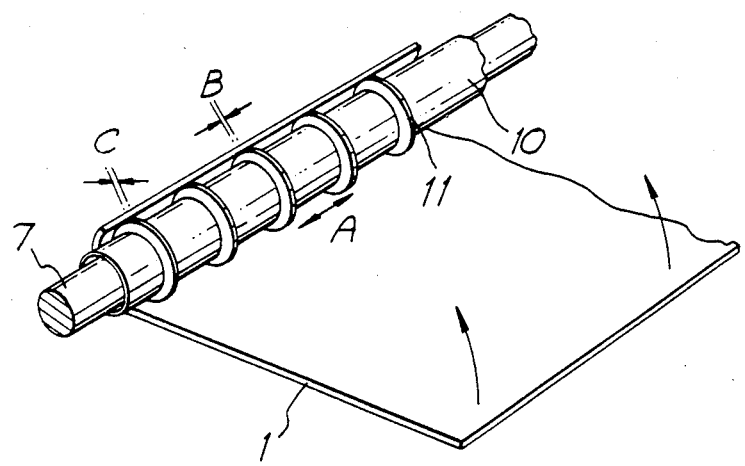
Figure 16:
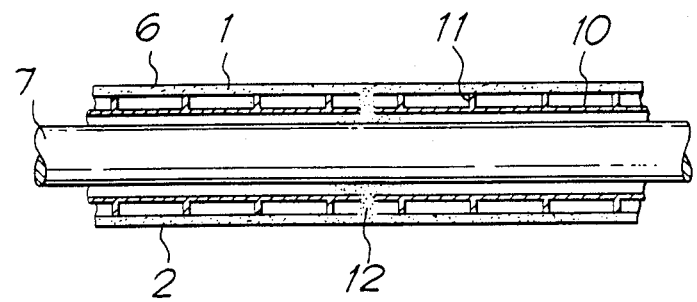
Figure 17:
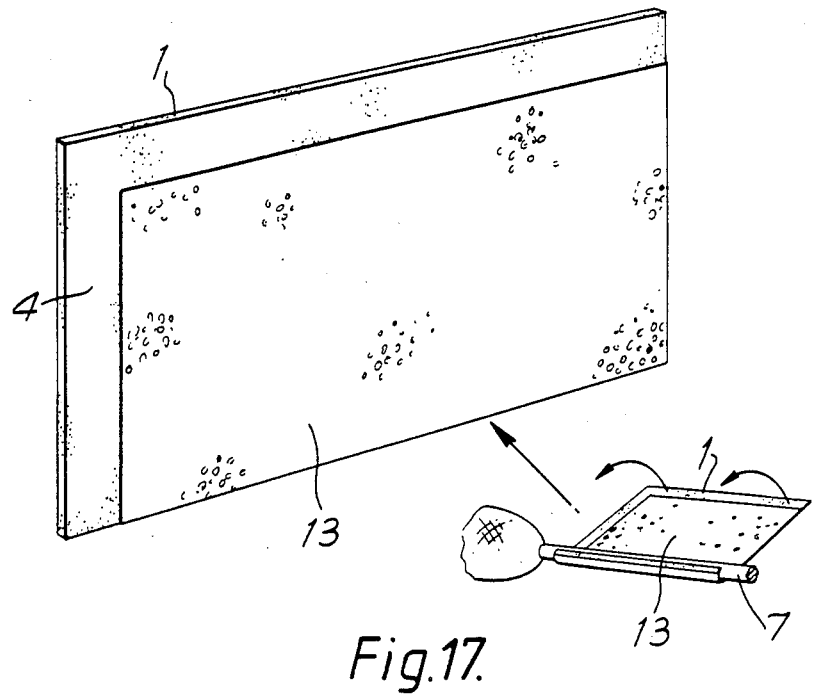

FIG. 6a and 6b illustrate schematically in perspective the preferred arrangement of hot melt adhesive 2 and mastic 5 at separate locations on the foil, with the optional overall pressure-sensitive adhesive coating again indicated by dots;

FIG. 7 shows the foil member carrying a thermochromic indicator coating;

FIG. 8 shows the foil member of FIG. 7 assembled in a sleeve with the termochromic composition beyond the end of the sleeve;

FIGS. 9 and 10 show a foil and assembly similar to those of FIGS. 7 and 8, with heat insulation carried on the foil to protect it from direct heating during heat recovery of the end of the sleeve;

FIGS. 11 and 12 show a plan view and partial section, respectively, of a foil member of the invention;

FIGS. 13 and 14 show sections of further embodiments of foil members;

FIG. 15 shows a ribbed tube serving as a heat barrier member;

FIG. 16 shows a longitudinal cross-section of a heat barrier tube;

FIG. 17 shows how a foam sheet can be used as a heat barrier member; and

Figure 18:
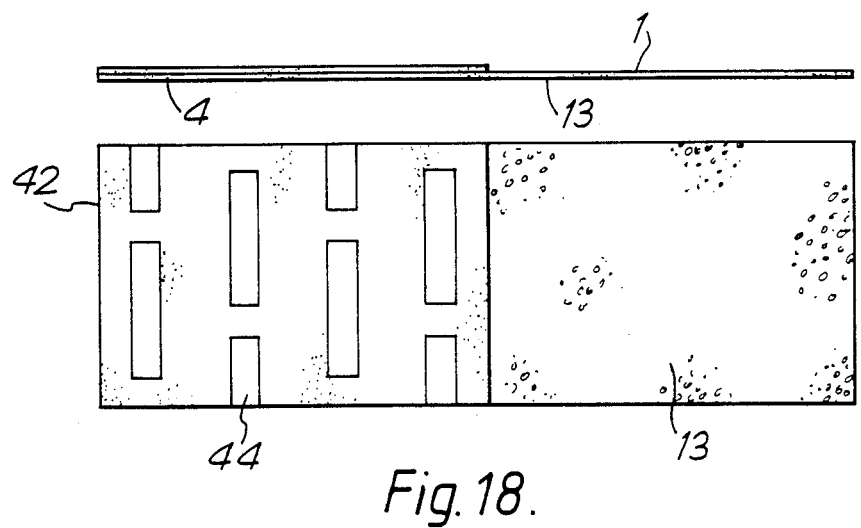

FIG. 18 is a modification of FIG. 17.

Figure 1:
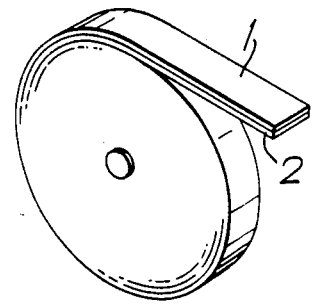
Figure 2:
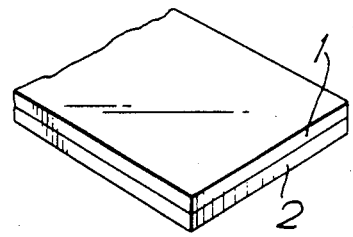
FIG. 2 shows in more detail the foil with its coating of adhesive.

FIGS. 1 and 2 show a relatively narrow tape of aluminium foil 1, width 1 cm, having a simple coating of hot melt adhesive. The foil is approximately 200 microns in thickness, and the adhesive coating is continuous, since the narow width of the tape does not necessitate special coating to assist wrapping.

Figure 3:
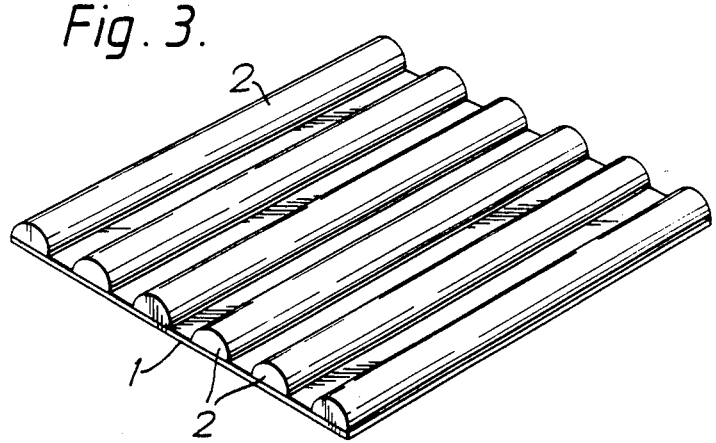
FIG. 3 shows in perspective the preferred beaded configuration of the heat-activatable adhesive on the foil, with a light coating of pressure-sensitive adhesive indicated by dots.
Figure 4:
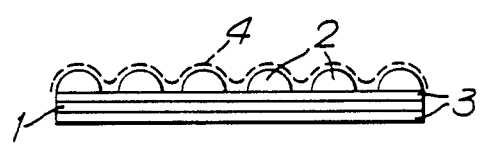
FIG. 4 shows the arrangement of FIG. 3 in cross-section and in more detail, including the preferred coating of polyolefin on either surface of the aluminium foil.

FIGS. 3 and 4 show the preferred beaded coating of the hot melt adhesive 2 on the foil 1, (250 mm width), FIG. 4 also showing the preferred coating 3 of polyethylene on both surfaces of the foil, and the preferred overlying thin coat of presssure-sensitive adhesive 4 being indicated by dots. FIGS. 6a and 6b show schematically the preferred arrangment of hot melt adhesive 2 and mastic 5 at different locations on the foil, for the aforementioned purposes, with the pressure-sensitive adhesive again indicated by dots.

In all these cases, the aluminium foil 1 is approximately 200 microns in thickness, the polyethylene coating 3 is approximately 50 microns in thickness, and the coating weight of adhesives is approximately 500–1000 g/m$^2$, preferably 750 g/m$^2$, for hot melt alone, or 300–600 g/m$^2$ hot melt and 400–700 g/m$^2$ mastic for the combination of hot melt and mastic, and 15–30 g/m$^2$ for the pressure sensitive adhesive (if present). The aforementioned preferred hot melt adhesive was used, with a polystyrene/polybutadiene based pressure sensitive adhesive.

Figure 5:
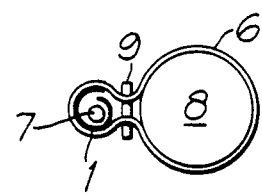
FIG. 5 shows in perspective the coated aluminium foil wrapped around a small diameter cable.

In use, the foil is wrapped around the smaller diameter cable portion as shown in FIG. 5, with the adhesive beads, if present, running along the cable, thus facilitating the wrapping operation, since the foil bends more easily at the places between the adhesive beads. The pressure-sensitive adhesive helps to hold the foil in place prior to heat-recovery of the sleeve 6 (FIG. 5) around the smaller cable 7 and larger cable 8. Upon heat-recovery of the sleeve 6, the cables 7 and 8 are subjected to compressive forces and the smaller cable 7 tends to be overheated, but is substantially protected from distortion or indentation otherwise caused by the hard edges of branch-off clip 9, or of the sleeve 6, by virtue of the protective foil 1. In addition some of the heat load will be absorbed by the foil, thus helping to reduce overheating. The heat-activatable adhesive carried by the foil 1 is activated during this heat recovery, and bonds the foil securely to the cable 7, with the preferred mastic 5 (see FIG. 6a and 6b) forming a moisture seal and the hot melt adhesive 2 acting as a dam to retain the mastic in place as well as itself adding to the adhesive bond. The pressure-senstive adhesive 4, if present, is absorbed into the hot melt and mastic adhesives during this operation without ill effect, but may be omitted as the mastic normally has sufficient tack below its flow temperature.

FIGS. 7 and 8 show an advantageous embodiment of the invention in which the polyethylene foil 1 carrying the adhesive or sealant beads 2 carries on its surface remote from the beads a coating 20 of thermochromic indicator composition, which may or may not be reversible. When assembled in a sleeve 30 of known type, in this example having closure rails 31 and closure channel 32, surrounding a cable 33 with the indicator coating projecting from the sleeve, the indicator will change colour when a sufficient temperature is reached by conduction of heat along the foil from within the sleeve. Thus a suitably selected indicator can be used to indicate when the activation temperature of the adhesive or sealant on the foil has been reached inside the sleeve, greatly enhancing the accuracy of indication normally provided by the thermochromic coating 30 on the exterior of the sleeve itself. Suitable thermochromic coatings for the foil and the sleeve may be selected, for example, from those described in U.S. Pat. No. 3,816,335, British Pat. No. 1511053, and British patent application No. 79.43636, the coating for the foil preferably having a lower activation temperature than that for the sleeve.

The heat-recoverable sleeve may be of any suitable kind.

Heat-recoverable articles, especially heat-shrinkable articles, are now widely used in many areas where insulation, sealing and encapsulation are required. Usually these articles recover, on heating, towards an originnal shape from which they have previously been deformed, but the term "heat-recoverable", as used herein, also includes an article which, on heating adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962 and 3,086,242. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In other articles, as described, for example, in British Pat. No. 1,440,524, an elastomeric member such as an outer tubular member is held in a stretched state by a second member, such as an inner tubular member, which, upon heating, weakens and thus allows the elastomeric member to recover.

So-called "wrap-around" sleeves have also been developed. Basically these are heat-recoverable sheets which can be wrapped round the substrate to form a generally tubular shape and which, in general, are provided with fastening means for holding them in the wrapped-up configuration during recovery. Typically such fastening means are mechanical in nature and comprise, for example, rigid clamps, pins or channel members which co-operate with suitably shaped moulded or extruded protruberances adjacent to the overlapping edges of the heat-recoverable sheet. Various types of fastening means are described, for example, in U.S. Pat. No. 3,379,218, British Pat. Nos. 1,155,470, 1,211,988 and 1,346,479, and British published patent application No.

2019120A. In other applications, however, the sheet may be held in the wrapped-up configuration during recovery by means of an adhesive which may, in some cases, be applied on site. End caps (or sleeves having one end closed) may be used for some applications.

Referring to FIGS. 11 and 12, foil member 40 comprises a sheet 42 of aluminium of 200 microns thickness of grade 99.5% soft that has a series of rectangular apertures 44 therethrough. The apertures may have another shape, for example diamond shape, and preferably extend as shown to the edges of the foil 40 to assist wrapping around a cable. To the latter end, the apertures may be elongate in a direction that extends, in use, longitudinally of the cable. Each surface of the sheet 42 is coated in polyethylene 46. The top or outer surface of the sheet 42 is coated with a hot-melt adhesive 48, and the bottom or inner surface is coated with another hot melt adhesive 50 that is pressure sensitive. The pressure sensitive adhesive 50 is protected prior to installation of the foil 40 by a release paper 52.

As with the already-described embodiments of the invention, the foil 40 is wrapped around a cable, particularly a small diameter cable that is adjacent an appreciably larger cable, either with or without overlapping itself. In the latter respect, the more susceptible the cable is to damage by overheating, the more desirable is an overlap, for example of 100% or 360°. If provided, a release paper 52 is first removed and then the foil 40 placed in position around the cable, and enclosed by a heat recoverable sleeve. On recovery of the sleeve, adhesive either from the foil and/or from a coating on the sleeve, flows through the apertures 44 to secure the foil 40 to the cable.

It will be noted from FIG. 5, that with an appreciable diameter difference between the two cables, difficulty may be experienced in conducting heat to the region therebetween, and that overheating of the smaller cable may occur in the attempt. The foil member thus provides mechanical protection of the heated smaller cable and maintains its integrity, even though it may be softened by the heating required to effect sealing and may be surrounded by hot molten adhesive, on recovery of the sleeve. Such protection is particularly desirable when the sleeve material is relatively thick, suitable for encompassing the large diameter cable, and thus exerts an appreciable inwardly-directed force on recovery.

FIGS. 13 and 14 show further foil members in which an aluminium sheet 60 receives (FIG. 13) discrete portions of hot melt adhesive 62 and is overlaid with a continuous coating 64 of pressure sensitive adhesive, and alternatively receives (FIGS. 14) a continuous film 65 of hot melt adhesive that is overlaid with discrete portions 66 of pressure sensitive adhesive.

It will be appreciated that features of the previously-described embodiments, for example those relating to suitable adhesives, are equally applicable to the embodiment of FIGS. 11 to 14.

In FIG. 15, a ribbed tube, preferably of nylon, is used as a heat barrier member. The tube 10 bears ridges 11 which form pockets of insulating air when an aluminium or other metal sheet 1 is wrapped around the tube 10. The cable 7 to be protected passes through the tube 10. The dimensions are not critical but the dimension A is preferably about 10 mm, B about 1 mm and C about 1.5 mm. A longitudinal cross-section of this arrangement is shown in FIG. 16. A hot melt adhesive 16 is shown between the metal sheet 1 and an outer heat recoverable sleeve 6. Holes 12 are provided through the walls of the tube 10 to allow the passage of adhesive when heat is supplied for recovery of the sleeve 6. The size of the hole or holes 12 should be small enough to restrict the flow of heat but large enough to allow passage of sufficient adhesive. The distance between the ribs 11 and the thickness of the foil are ralated since the number of ribs is desirably small to reduce heat conductivity, but one has to ensure that the overlapping metal foil 1 does not collapse between the ribs. As mentioned above, a separation of 10 mm has been found satisfactory, and we prefer foil of thickness about 200 microns. A wraparound version of this heat brrier could be used, comprising a spiral of a poor heat conducting material which would be wound around the cable to be protected. Two thicknesses of metal foil would conveniently be used.

FIGS. 17 and 18 illustrate an alternative heat barrier member. A foil 1 is coated with a foam 13 and has a border 4 of contact adhesive. As can be seen in the inset to FIG. 17, the border of contact adhesive is used to secure the whole metal foil member to the cable 7 to be protected. The metal foil member can be wrapped around the cable 7 as many times as necessary, for example an overlap of 20°, 360° or as many as, say, three times round. The foam, which is preferably a closed cell, cross-linked polymeric foam, provides the heat insulation required to protect the cable. More than one layer of the metal foil member can be provided by ways other than simply wrapping it many times around the cable: for example the foil member could be folded in two and the double thickness wrapped around the cable, giving an insulating layer which has a flattened V-shaped cross-section. Alternatively, the foil member could itself be of double thickness, fashioned as a closed bag containing air or some other insulating solid or fluid such as water. These possibilities may be used in addition to or instead of the foam heat barrier layer.

We claim:

1. A method of enclosing a cable splice, branchout, or termination, having a plurality of insulated cable portions extending therefrom, which comprises positioning a heat-recoverable member around the splice, branchout or termination in such a manner that a plurality of insulated cable portions extend from at least one end of said member; placing around at least one of the cable portions individually a metal foil member of such stiffness as substantially to prevent radial distortion or indentation of the insulation of the cable portion during heat recovery of the heat-recoverable member; and heating said member to cause recovery thereof.

2. A method according to claim 1, wherein one of the cable portions is of substantially smaller diameter than at least one other of the cable portions and the metal foil member is placed around the smaller diameter cable portion.

3. A method of enclosing a cable splice, branchout, or termination, having at least one insulated cable portion extending therefrom, which comprises positioning a heat-recoverable member around the splice, branchout or termination in such a manner that at least one insulated cable portion extends from at least one end of said member; placing around said cable portion individually a metal foil member arranged to extend from within the heat-recoverable member to a position beyond an end of the heat-recoverable member, the metal foil member having sufficient stiffness substantially to prevent radial distortion or indentation of the insulation of the cable portion during heat recovery of the heat-recoverable member, and heating said member to cause recovery thereof.

4. A method according to claim 1 or 3, wherein the metal foil member carries heat-activatable adhesive on at least part of its surface facing the cable portion around which it is placed.

5. A method according to claim 4, wherein the adhesive is present in discrete portions, distributed so as to facilitate placing of the foil around the cable portion.

6. A method according to claim 5, wherein the adhesive is in the form of substantially parallel beads arranged to extend along the cable portion when the foil member is placed there-around.

7. A method according to claim 4, wherein the metal foil member carries hot melt adhesive and mastic respectively at separate locations thereon.

8. A method according to claim 7, wherein the metal foil member carries two areas of hot melt adhesive on opposite sides of an area of mastic, so that the hot melt can form a dam to resist flow of the mastic in either direction along the cable in use.

9. A method according to claim 8, wherein the mastic has a substantially higher flow temperature than the hot melt adhesive.

10. A method according to claim 4, wherein a coating of pressure-sensitive adhesive is carried on the surface of the heat activatable adhesive, for bonding to the cable portion.

11. A method according to claim 4, wherein the metal foil member is coated with polyolefin, the adhesive overlying the polyolefin.

12. A method according to claim 11, wherein the polyolefin is corona or flame treated.

13. A method according to claim 11, wherein the polyolefin is polyethylene, and thickness of the polyethylene coating is from 40 to 60 microns.

14. A method according to claim 1 or 3, wherein the metal foil member comprises aluminium foil of thickness 150 to 250 microns.

15. A method according to claim 1 or 3, wherein the foil member carries temperature indicating means comprising a thermochromic composition on the surface of the metal foil member remote from the cable portion it surrounds and metal foil member protrudes from an end of the heat-recoverable member so that at least part of the thermochromic composition is visible.

16. A method according to claim 15, wherein thermal insulation is provided at or immediately adjacent to the end of the heat-recoverable member to protect the temperature indicating means from direct heating during heat recovery of the heat-recoverable member.

17. A method according to claim 1 or 3, wherein heat-activatable adhesive is provided within the heat-recoverable member, and wherein the metal foil member has apertures which permit flow of said adhesive therethrough to secure the metal foil member to the cable portion.

18. A method according to claim 17, wherein heat-activatable adhesive is secured, before heat recovery to an inner surface of the heat-recoverable sleeve.

19. A method according to claim 17, wherein the metal foil member carries at least a portion of said heat-activatable adhesive and has pressure sensitive adhesive applied thereto to assist in locating the metal foil member on the cable portion.

20. A method according to claim 19, wherein the heat-activatable adhesive carried by the metal foil is secured to at least a portion of the pressure sensitive adhesive.

21. A method according to claim 19, wherein the pressure sensitive adhesive is applied to at least a portion of said heat-activatable adhesive carried by the metal foil member.

22. A method according to claim 17, wherein at least some of the apertures of the metal foil member extend to an edge thereof to facilitate placing of the metal foil member around the cable portion.

23. A method according to claims 17, wherein the edges of at least some of the apertures are defined by straight lines.

24. A method according to claim 23, wherein said apertures are of generally rectangular or diamond shape.

25. A method according to claim 17, wherein heat-activatable adhesive is applied to one major surface of the metal foil member and a pressure-sensitive adhesive is applied to the other major surface of the metal foil member.

26. A method according to claim 1 or 3, wherein the foil member is placed around the cable so as to overlap itself, preferably by at least 20° of arc.

27. A method according to claim 1 or 3, wherein the metal foil member comprises a metal foil and a heat barrier member.

28. A method according to claim 27, wherein the heat barrier member comprises a ribbed tube through which the cable portion passes, and around which the metal foil is placed; the foil being spaced from the body of the tube by the ribs.

29. A method according to claim 28, wherein the ribbed tube comprises nylon.

30. A method according to claim 28, wherein the ribbed tube has a hole in its wall which allows passage of a molten adhesive into the inside of the tube.

31. A method according to claim 27, wherein the heat barrier member comprises a foamed material, which is bonded to the metal foil.

32. A method according to claim 31, wherein the foamed material is a cross-linked closed cell foamed material.

33. A method according to claim 31, wherein the foamed material covers only a part of the surface of the metal foil, leaving a border of metal foil coated with a pressure sensitive adhesive for securing the metal foil member around the cable portion.

34. A method according to claim 27, wherein the metal foil member is of double thickness, the two thicknesses enclosing between them a solid or fluid of poor heat conductivity.

35. A cable splice, branchout, or termination, comprising a heat-recoverable member surrounding a plurality of cable portions extending out of an end of the member, at least one of the cable portions being individually surrounded by a metal foil member of such stiffness that the foil-surrounded cable portion remains substantially free of radial distortion during heat recovery of the heat-recoverable member.

36. A cable splice, branchout or termination according to claim 35, wherein one of the cable portions is of substantially smaller diameter than at least one other of the cable portions and the metal foil member surrounds the smaller diameter cable portion.

37. A cable splice, branchout or termination comprising a heat-recoverable member surrounding at least one cable portion extending out of an end of the member, the cable portion being individually surrounded by a metal foil member extending from within the heat-recoverable member to a position beyond the end thereof, the foil member having such stiffness that the foil-surrounded cable portion remains substantially free of radial distortion or indentation during the heat recovery of the heat recoverable member.

38. A cable splice, branchout, or termination according to claim 35 or 37, wherein the metal foil member comprises aluminium foil of thickness 150 to 250 microns, carrying a heat-activatable adhesive on at least part of its surface facing the cable portion.

39. A cable splice, branchout, or termination according to claim 38, wherein the metal foil member also carries a mastic, the mastic and heat-activatable adhesive being respectively at separate locations.

40. A cable splice, branchout, or termination according to claim 38, wherein the metal foil member also carries a pressure-sensitive adhesive, for bonding to the cable portion.

41. A cable splice, branchout, or termination according to claim 38, wherein the metal foil member is coated with polyolefin, the adhesive overlying the polyolefin.

42. A cable splice, branchout, or termination according to claim 38, wherein the foil member carries a temperature indicating means comprising a thermochromic composition on the surface of the metal foil member remote from the cable portion it surrounds and the metal foil member protrudes from an end of the heat-recoverable member so that at least part of the thermochromic composition is visible.

43. A cable splice, branchout, or termination according to claim 42, wherein thermal insulation is provided at or immediately adjacent to the end of the heat-recoverable member to protect the temperature indicating means from direct heating during heat recovery of the heat-recoverable member.

44. A cable splice, branchout, or termination according to claim 38, wherein heat-activatable adhesive is provided between the metal foil member and the heat-recoverable member and the metal foil member has apertures which permit flow of said adhesive therethrough to secure the metal foil member to the cable portion.

45. A cable splice, branchout, or termination according to claim 38, wherein the metal foil member comprises a metal foil and a heat barrier member.

46. A cable splice, branchout, or termination according to claim 45, wherein the heat barrier member is a ribbed plastics tube or a closed cell foamed material.

47. A splice, branchout, or termination according to any of claims 35–37, but after heat recovery of the recoverable sleeve.

* * * * *